United States Patent
Singh et al.

(10) Patent No.: US 9,262,451 B1
(45) Date of Patent: Feb. 16, 2016

(54) DATA QUALITY CHECKING AND AUTOMATIC CORRECTION

(71) Applicant: AMAZON TECHNOLOGIES, INC., Reno, NV (US)

(72) Inventors: Aman Preet Singh, Sammamish, WA (US); Rakesh Kumar Singh, Bellevue, WA (US); Samrajya Lakshmi Gadde, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 175 days.

(21) Appl. No.: 13/932,710

(22) Filed: Jul. 1, 2013

(51) Int. Cl.
*G06F 17/30* (2006.01)
*G06F 7/00* (2006.01)

(52) U.S. Cl.
CPC ................................. *G06F 17/30303* (2013.01)

(58) Field of Classification Search
None
See application file for complete search history.

(56) References Cited

U.S. PATENT DOCUMENTS

| | | | |
|---|---|---|---|
| 2003/0126388 A1* | 7/2003 | Yamagami | 711/162 |
| 2004/0205642 A1* | 10/2004 | Menninga | G06F 17/211 715/244 |
| 2005/0044037 A1* | 2/2005 | Lawrence et al. | 705/38 |
| 2005/0198108 A1* | 9/2005 | Cabrera | G06F 9/443 709/201 |
| 2007/0136195 A1* | 6/2007 | Banjo | 705/43 |
| 2008/0027958 A1* | 1/2008 | Kapoor et al. | 707/101 |
| 2008/0163164 A1* | 7/2008 | Chowdhary et al. | 717/106 |
| 2008/0195430 A1* | 8/2008 | Rustagi | 705/7 |
| 2009/0006618 A1* | 1/2009 | Hayton | H04L 63/10 709/225 |
| 2010/0100468 A1* | 4/2010 | Spector | G06Q 20/04 705/35 |

\* cited by examiner

*Primary Examiner* — Sangwoo Ahn
(74) *Attorney, Agent, or Firm* — Lindauer Law, PLLC

(57) ABSTRACT

Data is checked against data quality rules and a corresponding report is generated. The report is provided to an entity, which may be a subscriber. Data correction schema is used to correct stored data. The data quality rules or the data correction schema may be amended or modified according to user input, which may be a subscriber entity. The subscriber or another entity may be billed for data quality or correction services as performed. A budget value may limit the scope or intensity of the data quality services that are performed, as well.

19 Claims, 9 Drawing Sheets

USER INTERFACE
502

OPTIONS AND RECOMMENDATIONS
504

LEARN HOW TO CREATE A DATA QUALITY REPORT 506 — [ CLICK HERE ]

VIEW OR SELECT PREDEFINED DATA QUALITY REPORTS 508 — [ CLICK HERE ]

LEARN MORE ABOUT DATA ANALYTICS 510 — [ CLICK HERE ]

RECOMMEND REPORTS FOR ME 512 — [ CLICK HERE ]

---

MY BUDGET FOR SERVICES 514: [ $1000 ]   REMAINING [ $640 ]

BUDGET APPLIES PER 514(1):  WEEK [ ]   MONTH [X]   AGREEMENT [ ]

USE PRIORITIZED DATA QUALITY RULES 514(2)  [X]

---

DEFINE MY ENTITY OR BUSINESS TYPE 516:

| | | | |
|---|---|---|---|
| RETAILER 516(1) | [ ] | CORP. BUSINESS UNIT 516(4) | [X] |
| INDUSTRIAL / PROCESSING 516(2) | [ ] | TECH SERVICES 516(5) | [ ] |
| MANUFACTURING 516(3) | [ ] | OTHER 516(6) | [ ] |

---

LEARN HOW TO SET DATA CORRECTION SCHEMA 518 — [ CLICK HERE ]

---

VIEW MY SERVICE LEVEL AGREEMENT 520 — [ CLICK HERE ]

FIG. 5

DATA QUALITY CHECKING AND AUTOMATIC CORRECTION

BACKGROUND

Data warehouses, server farms and the like receive, store and provide data to and from one or more entities. Inventory control, accounting, e-commerce merchandising, and a host of other endeavors generate vast amounts of information that are stored and put to various uses. The accuracy of such data is paramount to the reliability of and confidence in actions that use the data.

BRIEF DESCRIPTION OF THE DRAWINGS

FIG. 5 is a block diagram of a user interface and illustrative options and recommendations related to data quality services.

Figure 1:
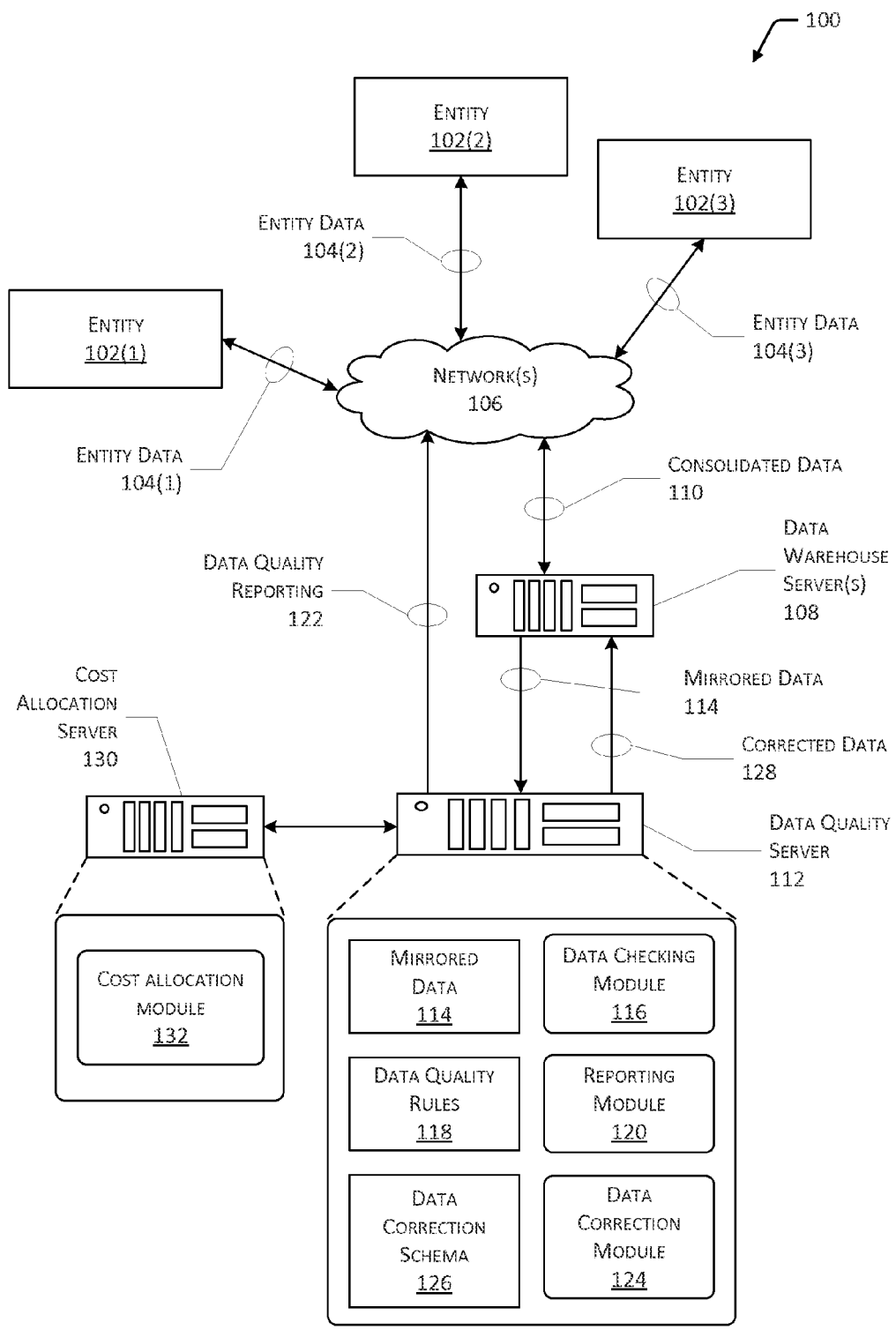
FIG. 1 is a block diagram of a system including respective entities, a data warehouse server and a data quality server that communicate with each other via a network or networks.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

There are numerous circumstances in which an entity generates data and information related to its respective activities or interests. Often, that data is needed for future use such as performance analytics, record keeping, inventory control, financial accounting, government regulatory compliance, and so on. In one example, a corporate structure includes numerous business entities having respective functions. Therein, data may be generated by one entity, and reported to or summarized for another entity within the corporation. Alternatively, an entity may later review or analyze the information it generates, thus operating as both a source and a recipient of the data, as well.

In another example, data produced or provided by one entity is stored in a data warehouse. Data is then extracted from the stored data and processed before provision to another entity. In still another example, data from a plurality of source entities is sold in total, summarized, or otherwise processed and provided to a paying subscriber entity. A myriad of other examples of data sourcing, storing, processing, provisioning or reporting are also contemplated.

Accuracy of data is important to the accuracy and reliability of future uses of that data. Such future uses may be the direct reporting or review of the original data itself, the synthesizing of other data or metadata using the original data, statistical or heuristic operations performed on the original data, and so forth. Therefore, data that is without errors or omissions, data elements that are consistent with predefined sets or definitions, numeric data values that fall within a predefined range and other parameters or characteristics are germane to future success.

In one example, one or more entities respectively provide data to a data warehouse service for storage, such as provided by a data warehouse server. The data warehouse server is considered in the singular for clarity, but in fact may comprise one or more servers or storage devices configured to communicate with other entities by way of a network or networks. The data warehouse server may be configured to perform any number of processes on the data, or generate any number of reports by way of analyzing the data. The data warehouse server may in turn provide the stored data, in whole or in part, to one or more other entities, to the source entity or entities, or provide one or more reports to various entities, and so on.

In the present example, the data warehouse server may also copy or "mirror" the data in whole or in part to a data quality service, such as provided by a data quality server. The data quality server is configured to check or compare the mirrored data against a set of data quality rules. The data quality rules may be defined by a user or users, a system administrator, a source or consumer entity of the data, a third-party subscriber for data quality services, or another entity. The data quality rules can include any suitable characteristics, values, functions, formatting or syntactical definitions, ranges or limitations for testing the accuracy of the mirrored data.

Non-limiting examples of data quality rules include a predefined numerical range within which a data value must lie, that a data value must be an integer, that a textual name or string must be part of a predefined set, that a data element is not a null or zero value, that a data value is consistent with a mathematical expression, that a date must lie within a predefined or calculable chronological range, and so on. Different data quality rules or sets can be used for checking different types of data, or data originating from or provided to respectively different entities, or in accordance with other distinctions or purposes.

Such a data quality server is configured to check the mirrored data in accordance with the corresponding data quality rules, and generate a report or reports commensurate with the results. The one or more reports are then provided to an entity or entities in accordance with a data quality services agreement, in accordance with internal quality assurance policies, or as determined by other practices or procedures.

In another example, at least some of the mirrored data is automatically corrected by the data quality server in accordance with one or more data correction schema. A data correction scheme is definable by a user or users, an administrator, or another entity. Non-limiting examples of data correction schemes or operations include conversion of non-whole numbers into integer values, the heuristic selection of a "closest match" name or string from a predefined set, the substitution of various punctuation or other characters within a string in accordance with a predefined syntax, substituting a default value for an inconsistent or out-of-range data value or element, and so forth. Other data correction schemes, operations, substitutions, or logical or heuristic functions may also be used.

The data quality server may then provide the corrected data to the data warehouse server for substitution in place of the erroneous data, for storage, or both. One or more reports may be generated and provided in view of the data correction operations, as well. A cost allocation service, such as provided by a cost allocation server may be used to receive information indicative of data quality or data correction operations performed by the data quality server. The cost allocation server can then calculate one or more billing values and provide these to respective entities.

Data quality checking or data correction operations may be selectively performed or limited in scope according to a predefined entity budget. For example, a subscriber entity may have predefined a set of hierarchical data quality rules based upon those data characteristics of descending importance or priority to them. This same subscriber entity has also defined a specific budget amount (e.g., in dollars) governing or capping data quality services or reporting to be provided on a weekly basis. Thus, the data quality server checks newly received mirrored data against the corresponding data quality rules, in a selective and hierarchical manner, so as to stay within the predefined budget amount. In this example, fewer than all of the data quality rules may be used if the new mirrored data is of sizable quantity, in order to remain within the budget. The corresponding report or reports, and the billing amount, are then provided to the subscriber entity in accordance with the weekly cycle of the service agreement.

Data quality checking or correction may therefore be performed toward in-house quality assurance, as directed by corporate policy, toward greater third-party confidence in the data, and so forth. Data quality services may also be billed accordingly so that cost recovery is a part of the overall system, perhaps to the point of profitability. Greater confidence in the data, and reports or products derived from the data, may be realized as contemplated herein.

FIG. 1 depicts views 100 of an illustrative system. The system is illustrative and non-limiting in nature. Respective entities 102(1), 102(2) and 102(3) may be defined by any entity that generates or provides data, receives data or reports from another entity or entities, or any combination of these. Non-limiting examples of the entities 102(1)-102(3) include logical or business units within a corporation, manufacturers or importers of merchandise, providers of various services, advertising companies, business news reporting or watchdog agencies, agencies of government, and so on. Three distinct entities 102(1), 102(2) and 102(3) are depicted in the interest of clarity, but other systems including any number of such entities are also contemplated.

The entities 102(1)-102(3) are respectively configured to provide (communicate or exchange) entity data 104(1), 104(2) and 104(3) with each other or other entities by way of one or more networks 106. The networks 106 may include the Internet (or access thereto), local area networks (LANs), wide area networks (WANs), and so on. Other entities or devices respectively being the same as or differing from any of the entities 102(1)-102(3), can also be connected to communicate with each other or other entities by way of the network(s) 106.

The system also includes one or more data warehouse servers 108. For simplicity and clarity, the data warehouse server 108 is referred to hereinafter in the singular. However, one having ordinary skill in the art can appreciate that any suitable number of data warehouse servers 108 may be used in a cooperative, parallel or redundant manner. The data warehouse server 108 is configured to receive the entity data 104(1)-104(3) from the entities 102(1)-102(3), collectively referred to as consolidated data 110. The consolidated data 110 may be stored within the data warehouse server 108. The consolidated data 110 may also be provided, in whole or in part, from the data warehouse server 108 to one or more of the entities 102(1)-102(3), or another entity or entities. Thus, the data warehouse server 108 provides or performs data storage and retrieval services.

A data quality server 112 is configured to communicate with the data warehouse server 108 and with the entities 102(1)-102(3), or with other devices or entities. Such communication may be by way of the one or more network(s) 106 or by other suitable pathways. The data warehouse server 108 is configured to copy or "mirror" the received consolidated data 110, or any of the entity data 104(1)-104(3), in whole or in part, and provide mirrored data 114 to the data quality server 112.

The data quality server 112 includes a data checking module 116. The data checking module 116 may include any suitable resources such as electronic circuitry, machine-readable program code stored on a computer-readable storage media (CRSM), or other constituency. The data checking module 116 is configured to check or compare the mirrored data 114 against one or more data quality rules 118 stored within the data quality server 112.

A reporting module 120 of the data quality server 112 is configured to use results provided by the data checking module 116 to generate one or more reports. The reports are then provided as data quality reporting 122 to one or more of the entities 102(1)-102(3), or another entity or entities. The reporting module 120 may include any suitable resources such as electronic circuitry, machine-readable program code stored on a CRSM, or other elements or constituency.

A data correction module 124 of the data quality server 112 is configured to automatically correct (or modify) some or all of the mirrored data 114 using one or more data correction schema 126. Corrected data 128 is provided back to the data warehouse server 108 where it is substituted for the corresponding erroneous (or unmodified) data within the consolidated data 110, stored in addition to the consolidated data 110, or used for other purposes. The data correction module 124 may include any suitable resources such as electronic circuitry, machine-readable program code stored on a CRSM, or other elements or constituency. The data quality server 112 therefore performs various services including data quality checking, reporting, or data correcting, or any suitable combination of these.

User interfaces may be respectively presented to the users of the entities 102(1)-102(3) so as to define or modify the data quality rules 118, to define or modify the data correction schema 126, and so forth. In one example, a user of the entity 102(1) selects or defines parameters within the reporting module 120 for a data quality report to be received on a weekly basis. In another example, a user of the entity 102(2) defines several rules or parameters stored within the data quality rules 118. In yet another example, a user of the entity 102(3) defines a complete correction scheme stored within the data correction schema 126. Non-limiting examples of such user interfaces are described and illustrated hereinafter.

A cost allocation server 130 is configured to use a cost allocation module 132 to calculate one or more billing amounts in accordance with the actions performed by the data quality server 112. The one or more billing values are provide to one or more of the entities 102(1)-102(3) pursuant to respective data quality service agreements, corporate operating standards, or other established practices or governance. The cost allocation server 130 therefore performs cost-of-service calculation and billing services.

Individual servers are depicted for clarity of illustration and not by way of limitation. It is understood that more than one computing device may provide the various services and functionalities described above. For example, the data quality services may be provided by a plurality of servers configured in a distributed computing environment.

The figures in this disclosure are illustrative. In some instances various features have been exaggerated in size for clarity of illustration. The figures are not necessarily to scale, and may not necessarily be proportionate with one another.

Figure 2:
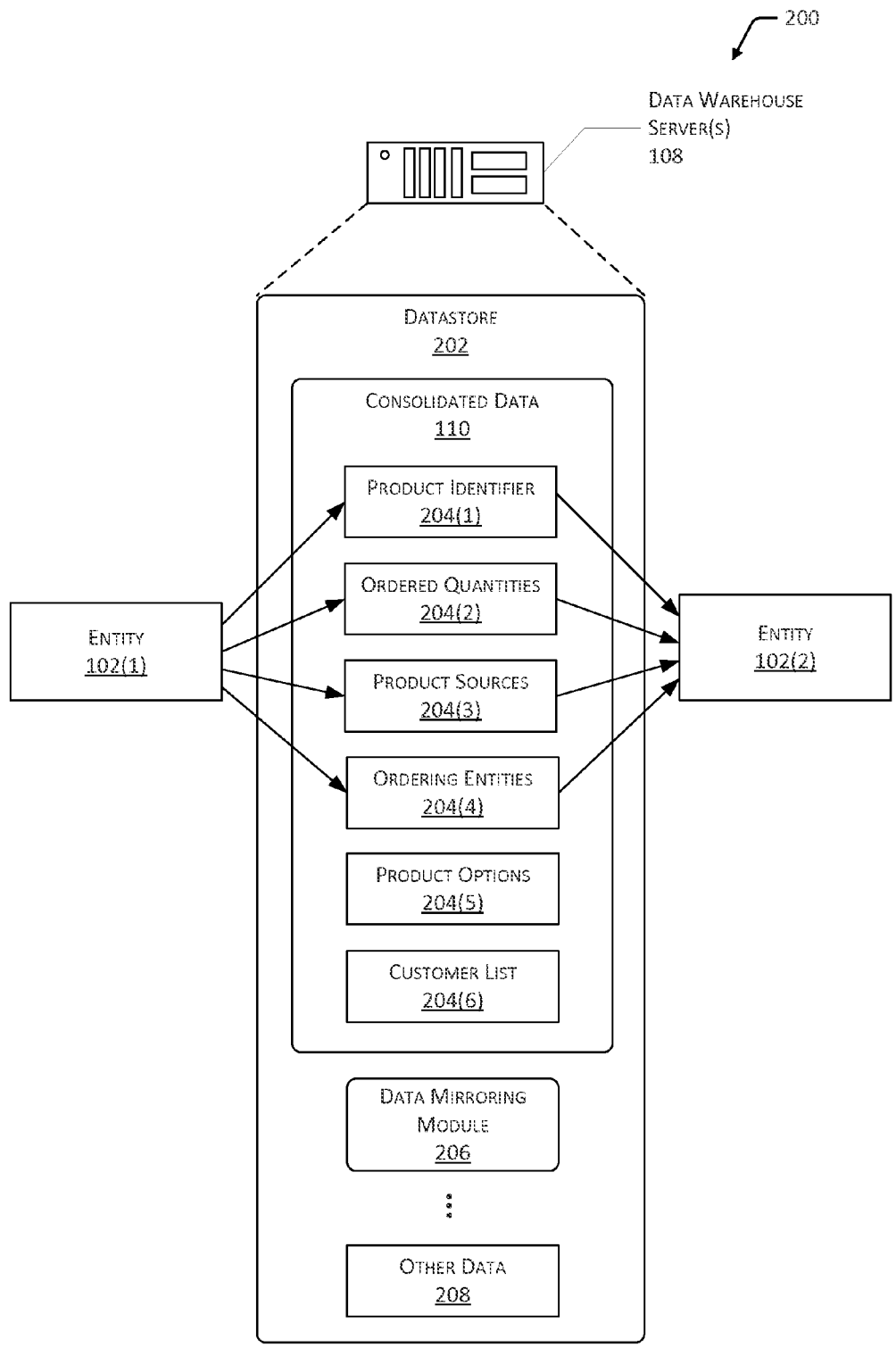
FIG. 2 is block diagram including illustrative data types.

FIG. 2 depicts a view 200 of the data warehouse server 108 and different data types provided by or to the entities 102(1) and 102(2). The respective elements, operations and relationships depicted in the view 200 and described below are illustrative and non-limiting. Other data types, respective and cooperative relationships between elements, and so on, are contemplated herein.

The data warehouse server 108 includes a datastore 202. The datastore 202 may use a flat file, database, linked list, tree, or other data structure to store the information. In some implementations, the datastore 202 or a portion of the datastore 202 may be distributed across one or more other devices including other warehouse servers 108, network attached storage, and so forth. The datastore 202 includes the consolidated data 110, as described in a non-limiting manner below.

Product identifier data 204(1) is stored within the consolidated data 110. The product identifier data 204(1) includes respective identification numbers or ID codes for one or more items of merchandise offered for sale. For example, the entity 102(1) offers for sale at least some of the items identified by the product identifier data 204(1). The entity 102(1) may be a business unit within a corporate structure and a source of at least some of the product identifier data 204(1). The product identifier data 204(1) may be used, in some instances, to define a set of ID codes against which data may be quality checked.

Ordered quantities data 204(2) is also stored within the consolidated data 110. The ordered quantities data 204(2) includes respective quantities ordered for each of the merchandise items identified by the product identifier data 204 (1). For example, the ordered quantities data 204(2) may include respective quantities for each of 4 different merchandise items sold through the entity 102(1) in a recent sales transaction. The ordered quantities data 204(2) may be used, for example, to generate historical or statistical sales data for the entity 102(1).

The consolidated data 110 further includes product sources data 204(3). The product sources data 204(3) includes respective names, addresses, contact information or other data for sources of the merchandise items of the product identifier data 204(1). For example, the product sources data 204(3) may indicate the company name, address, telephone number, e-mail address, website, or other contact information for each of 2 different sources (e.g., manufacturers or importers) of a particular item of merchandise sold by the entity 102(1). The product sources data 204(3) may be used, for example, to define a set of source names against which data may be quality checked.

The consolidated data 110 also includes ordering entities data 204(4). The ordering entities data 204(4) includes entity names, identifier numbers or other information specifically identifying various entities. The ordering entities data 204(4) may also identify one or more of the merchandise items of the product identifier data 204(1) that a particular entity is authorized to sell or purchase (or both). For example, the ordering entities data 204(4) may specifically name the entity 102(1) and specify 25 different merchandise items that the entity 102(1) is authorized to sell (or place orders for). The ordering entities data 204(4) may be used, for example, to verify that a particular entity is authorized to order a specific item of merchandise during data quality checking.

Product options data 204(5) is also stored within the consolidated data 110. The product options data 204(5) may include various optional characteristics such as sizes, colors, materials or finishes, and so on, correlated to respective merchandise items of the product identifier data 204(1). For example, the product options data 204(5) may indicate that a particular ballpoint pen is available with rosewood, titanium, or gold-plated body construction, and in either blue or black ink.

Customer list data 204(6) is also stored within the consolidated data 110. The Customer list data 204(6) may include names and contact information for all costumers that have placed orders through any of the entities identified in the ordering entities data 204(4). For example, the customer list data 204(6) may include names, addresses, electronic payment information or other data for each of 97 different customers that have placed orders by way of entity 102(1).

The datastore 202 may also include a data mirroring module 206. The data mirroring module 206 is configured to mirror (or copy) some or all of the consolidated data 110 as the mirrored data 114 provided to the data quality server 112. In one instance, the data mirroring module 206 is configured to mirror new data as it arrives (or nearly so) from one or more source entities (e.g., 102(1)-102(3)). In another example, the data mirroring module 206 is configured to track or flag new data as it arrives and then periodically provide that new data to the data quality server 112.

For instance, such new data may be copied (mirrored) once per hour, twice per day, in response to an entity request, or in accordance with other scheduling or procedures. Other data provisioning schemes can also be performed by the data mirroring module 206. The data mirroring module 206 may include any suitable resources such as electronic circuitry, machine-readable program code stored on a CRSM, and so forth. The datastore 202 may also include other data 208. The other data 208 may include other suitable data types or information used or generated during operations of the data warehouse server 108.

In another example, the entity 102(2) receives or "consumes" data within the consolidated data 110. Specifically, the entity 102(2) audits and reviews sales performance information within the same corporate structure as the entity 102(1). The entity 102(2) therefore receives one or more reports that summarize the data types 204(1)-204(4) within the consolidated data 110. At least some of the data sought by the entity 102(2) is generated or provided by the entity 102(1). Therefore, the entity 102(1) is a source of data, and the entity 102(2) is a recipient of data, each having complimentary roles in the example depicted in the view 200. Countless other scenarios involving respective entities and data sourcing/receiving relationships are also contemplated.

Figure 3:
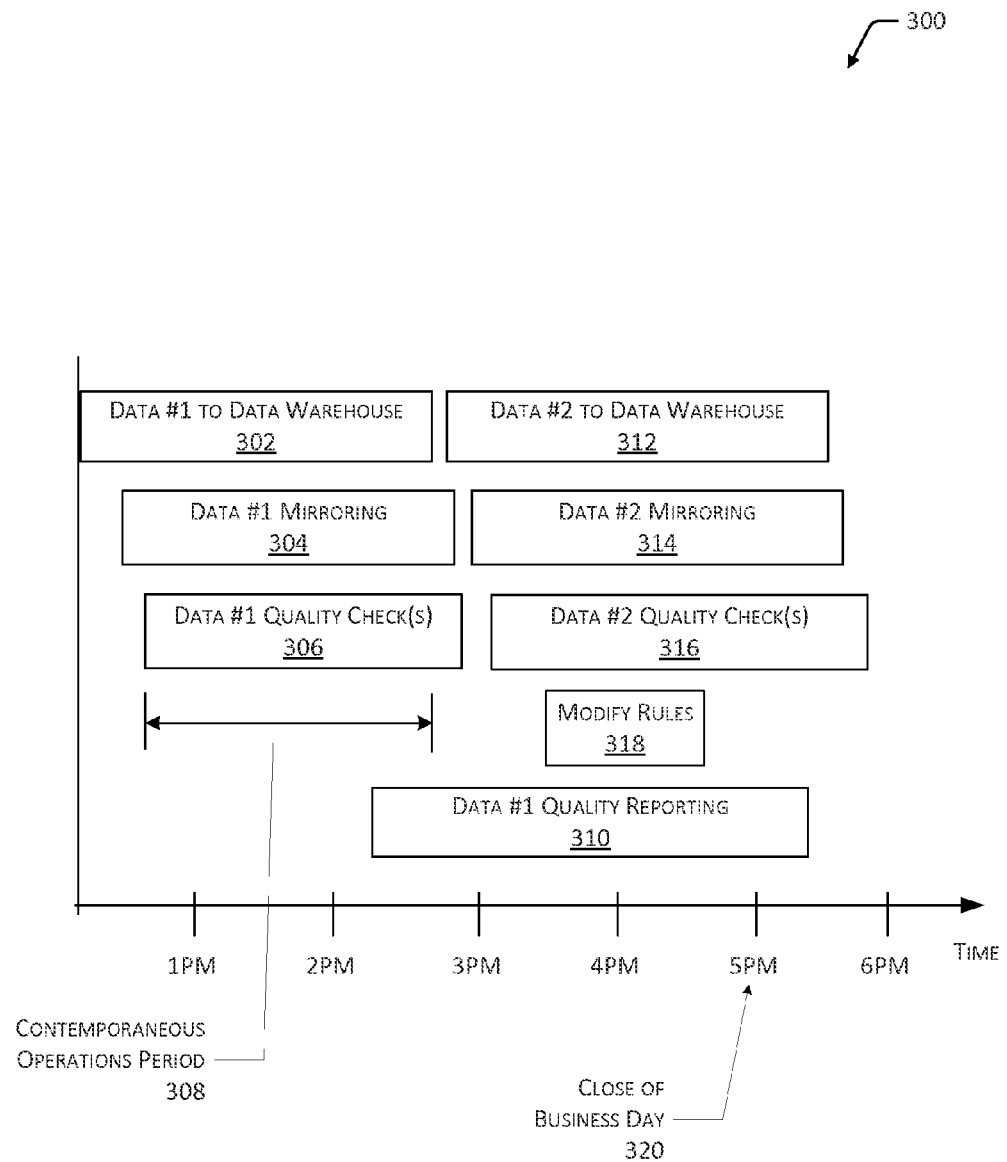
FIG. 3 illustrates respective operations presented along a timeline.

FIG. 3 depicts a view 300 of respective operations presented on a timeline. The operations and details of the view 300 are illustrative and non-limiting in nature. Other operations or the synchronicity of those operations may also be considered.

A first body or packet of data, designated as data #1, is provided to the data warehouse server 108 in an operation 302. For example, the entity 102(1) provides the data #1 (e.g., entity data 104(1)) related to respective customer orders for merchandise items sold in an online e-commerce environment (i.e., Internet website) to the data warehouse server 108. The operation 302 is depicted as continuous over a period of about 3 hours in the interest of clarity. Alternatively, the operation 302 may be performed as the provision of a plurality of data packets (data bursts) over the depicted time period.

Shortly after the beginning of the operation 302, the data warehouse server 108 begins mirroring the data #1 to the data quality server 112 in an operation 304. In the present example, the data warehouse server 108 copies the entity data 104(1) defining the data #1, in whole or in part, to the data quality server 112 as mirrored data 114. The newly received mirrored data 114 is stored as needed in the data quality server 112 in preparation for, or contemporaneous with, data quality checking operations.

A brief time after the beginning of the operation 304, the data quality server 112 begins checking the quality of the data #1 in an operation 306. In the present example, the data checking module 116 uses one or more of the data quality rules 118, as applicable, to compare against the data #1 that is being received via the operation 304. It is noted that a contemporaneous operations period 308 is defined by a time span during which respective portions of the operations 302, 304 and 306 are performed simultaneously.

That is, the data #1 may be mirrored to the data quality server 112 as (or immediately after) it is received by the data warehouse server 108, and the data #1 may be checked against applicable data quality rules 118 as (or immediately after) it is received by the data quality server 112. Eventually, the data quality checking of the data #1 is complete, and the operation 306 is ended.

The reporting module 120 generates one or more reports corresponding to the data #1 quality checking of the operation 306, as an operation 310. The operation 310 begins at some time during the operation 306 and, as a result, a report or reports may be generated and provided in the event that data quality problems or issues are detected. The one or more reports are provided to one or more entities such as the entity 102(2), which is concerned with sales performance auditing. For example, if the operation 306 detects a data quality problem in the data #1, the reporting module 120 may be configured to provide a corresponding report immediately, in accordance with data quality rule prioritization or other criteria. The timely nature of such data quality reporting may serve to reduce or eliminate corrective or remedial efforts that might otherwise be required.

A second body of data, designated as data #2, is then provided to a data warehouse server in an operation 312. For example, the entity 102(3) provides entity data 104(3) defining the data #2, which is related to other respective customer orders for merchandise items, to the data warehouse server 108. The operation 312 is depicted as being continuous over a time span, but may be performed as the provision of plural discrete data packets or bursts over that time period.

Just after the beginning of the operation 312, the data warehouse server 108 begins mirroring the data #2 to a data quality server in an operation 314. In the current example, the data warehouse server 108 mirrors the data #2 in whole or in part to the data quality server 112 as other mirrored data 114. The newly received mirrored data 114 (i.e., data #2) is stored in the data quality server 112 in preparation for data quality checking.

Soon after the beginning of the operation 314, the data quality server 112 begins checking the data quality of the data #2 in an operation 316. In the present example, the data checking module 116 uses one or more applicable rules of the data quality rules 118 to compare against the data #2 as received by way of the operation 314. Thus, at least some of the respective operations 312, 314 and 316 are being performed simultaneously.

Sometime after the operation 316 begins, a system administrator accesses the data quality server 112 in order to modify some portion of the data quality rules 118 that are applicable to the data #2. For example, the system administrator may wish to define a rule enabling verification that merchandise order quantities (e.g., 204(2)) fall within a definable range. In another example, the system administrator may wish to define a rule verifying that product identifiers (e.g., 204(1)) are all elements within a predefined set. The system administrator thus makes these or other modifications to the data quality rules 118 accordingly as an operation 318.

The operation 318 is performed simultaneously with a portion of the operation 316. A first portion of the data #2 is checked against the data quality rules 118 in an original condition as when the operation 316 began. A second portion of the data #2 is checked against the modified data quality rules 118 after the operation 318 is complete. Therefore, the data #2 quality checking of the operation 316 provides results stemming from 2 different quality rule sets. The data checking module 116 provides these results—mixed as they potentially may be—to the reporting module 120.

As depicted, all or a majority of the respective operations 302-318 are performed prior to a close of business day 320. Therefore, in the illustrated example, the data #1 and the data #2 may be received, stored, mirrored, quality checked and reported on—in whole or in large part—during regular business hours. It is contemplated herein that such operations 302-318 provide data quality checking measures that are timely in nature, and do not require performance during late night hours or similar scenarios.

Since the data quality checking may be performed immediately in response to receipt of that data from a source entity, quality reporting may be done and corresponding actions may be taken before errors, omissions or other problems result in costly remedial measures. Moreover, legal liability that may result from the use or sale of defective data may be minimized or avoided through the prompt checking, reporting or corrective actions contemplated herein.

Figure 4:
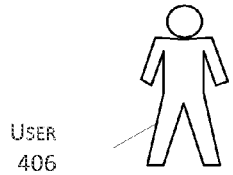
FIG. 4 is a block diagram of a user interface and illustrative user options and inputs related to data quality reporting.

FIG. 4 depicts a view 400 including a user interface 402. The user interface 402 and particular features and elements thereof are illustrative and non-limiting. The user interface 402 presents or includes a data quality report generation template (report template) 404. The report template 404 includes various options and input fields for selection and setting by a user 406. For purpose of example, the user 406 operates a user device that defines, or corresponds to, the entity 102(1). The user 406 may then customize the content of a report generated by the reporting module 120 in response to data quality checking performed by the data checking module 116.

The report template 404 includes a product identifier validation 408 option. The product identifier validation 408 option includes, or is defined by, respective ""Yes"" and "No" checkboxes. The user 406 is required to select either "Yes" or "No", with "No" being a default (automatic) selection. If the user 406 selects "Yes", the product identifier validation option 408 causes the corresponding report to indicate "Valid" or "Invalid" based on whether or not a particular product identifier (e.g., 204(1)) is an element of a predefined set of product identifiers. The user 406 may make their selection within the product identifier validation 408 option by mouse click, display touch or gesturing, or another suitable input technique.

An order quantity checking 410 option is also included in the report template 404. The order quantity checking 410 option includes respective "Yes" and "No" checkboxes, with "No" being a default selection for purposes of example. If the user 406 selects "Yes", then a number of other selectable or definable parameters apply, as described below. For purposes of example, the user 406 has selected "Yes" within the order quantity checking 410 option.

A lesser or equal to max allowable 410(1) option includes a single selection checkbox. If the user 406 selects the lesser or equal to max allowable 410(1) option, the report will indicate "Valid" or "Invalid" based on whether or not an ordered quantity (e.g., 204(2)) is less than or equal to a predefined maximum allowable value for that particular item of merchandise. The lesser or equal to max allowable 410(1) option may be useful, for example, with respect to certain items of merchandise having relatively limited inventory, or where manufacturer supply time is extended or long backorder periods are a problem. Thus, a merchant may be alerted to order more corresponding merchandise now (or soon) in an effort to avoid customer disappointment or cancelled orders.

A null/zero value not permitted 410(2) option includes a single checkbox. If the user 406 selects the null/zero value not permitted 410(2) option, the report will indicate "Valid" if an ordered quantity is neither zero nor left blank (null). Otherwise, "Invalid" is indicated on the report. The null/zero value not permitted 410(2) option may be useful, for example, to alert the entity 102(1) that an order has been placed by a customer that is incomplete with respect to desired quantity of a merchandise item. In another example, an option analogous to the null/zero value not permitted 410(2) option may be used to alert an entity that a customer has failed to include a shipping address, and so forth.

A must be integer value 410(3) option includes a single checkbox. If the user 406 selects the must be integer value 410(3) option, the report will indicate "Valid" if an ordered quantity is some integer value—that is, a whole number. Otherwise, "Invalid" is indicated on the report. The must be integer value 410(3) option may be useful, for example, to alert the entity 102(1) that an order placed by a customer has an ambiguous quantity specified for an item of merchandise item, such as 1.2 pairs of denim jeans.

A within the range of 410(4) selection includes input boxes for defining lesser and greater (i.e., lower and upper) values of a numerical range, respectively. If the user 406 provides valid lesser and greater values in the respective input boxes, then a valid range has been defined for checking an ordered quantity against. As depicted, the user 406 has specified a range of 1 to 20 units as "Valid" for the ordered quantity, and a data value outside of the range of the 410(4) selection would be indicated as "Invalid" on the report.

A selection made below 410(5) option includes a pull-down menu. The pull-down menu of the option 410(5) can include one or more respective values, sets, or ranges as predefined by the user 406 or another entity such as a system administrator. If the user 406 selects the selection made below option 410(5), the user 406 then also selects a specific entry predefined within the pull-down menu. The report will indicate "Valid" if the ordered quantity is consistent with the pull-down menu selection, otherwise the report will indicate "Invalid".

While not depicted in the interest of clarity, other pull-down menus may be used for making other user input selections in other respective templates or user interfaces. For example, a pull-down menu may provide a listing of predefined data quality rule sets and their respective values and parameters. Thus, a single selection made from such a pull-down menu may fully define a data quality report. Other uses or operations may also be made by way of pull-down menus.

The report template 404 also includes a product source validation 412 option. The product source validation 412 option includes respective "Yes" and "No" checkboxes, with "No" being a default selection. If the user 406 selects "Yes", the product source validation 412 option causes the corresponding report to indicate "Valid" or "Invalid" based on whether or not a particular product source (e.g., 204(3)) is an element of a predefined set of such source or manufacturers. The product source validation 412 option may be useful, for example, when a customer may order a product, such as a set of screwdrivers, from any of 3 different sources. The product source validation 412 option may then alert the entity 102(1) that a customer has specified an ambiguous or unlisted source name for their merchandise order.

An ordering entity validation 414 option is also provided. The ordering entity validation 414 option includes respective "Yes" and "No" checkboxes, with "No" being a default selection. If the user 406 selects "Yes", the ordering entity validation 414 option causes the corresponding report to indicate "Valid" or "Invalid" based on whether or not a particular entity (e.g., 204(4)) is authorized to order (or broker an order by another) for a particular item of merchandise. The ordering entity validation 414 option may then alert the entity 102(1) that they are lacking authorization to order the respective merchandise item.

The user interface 402 also includes an additional options control 416. The additional options control 416 may be configured to cause another report generation template to be presented, or additional matter or another page of the report template 404 to be presented to the user 406. Other matter, selections or options related to user 406 generation of a data quality report or reports may also be provided in response to an actuation of the additional options control 416.

FIG. 5 depicts a view 500 including a user interface 502. The user interface 502 and particular features and elements thereof are illustrative and non-limiting. The user interface 502 presents an options and recommendations (OAR) page 504 to the user 406 by way of a user device of one of the entities 102(1)-102(3), or another user device or entity. The OAR page 504 includes various options and opportunities for a user 406 to provide information about their circumstances and needs, to learn about different aspects of data quality checking or correction functions, and so on. Input and feedback acquired by way of the OAR page 504 may be used to recommend more effective data quality checking or other services to the user 406.

The OAR page 504 includes a learn how to create a data quality report 506 option. User 406 actuation of the option 506 causes the data quality server 112 to present another user interface or sequence of pages providing tutorial information on how to define or generate a data quality report such as, for example, using the report template 404 described above. Such tutorial information can include textual information, audio/visual presentations, rendered or animated teaching displays, and so on. The user 406 may actuate the option 506 control by way of mouse clicking, display touch or other gesturing, and so forth.

The OAR page 504 also includes a view or select predefined data quality reports 508 option. User 406 actuation of the option 508 causes the data quality server 112 to present one or more predefined data quality report templates for selection by the user 406. For example, the user 406 can quickly select a first report or set or reports to be used during data quality checking while being new and relatively unfamiliar with report options, generation, or the value or significance of data quality checking. Thus, the option 508 gets the user 406 "up and running" quickly with respect to data quality reporting, perhaps providing inspiration toward defining their own data quality checking or reporting criteria.

A learn more about data analytics 510 option is also included. The option 510 causes the data quality server 112 to provide tutorial information regarding how data is analyzed during quality checking operations. For example, the user 406 may be shown that certain types of numerical data are only meaningful as integer values, and that fractional or irrational values are ambiguous. In another example, the user 406 may be instructed that all valid product code numbers are constructed according to a predefined format or syntax. In this way, the user 406 may gain greater insight as to possible data quality checking methods or reporting options.

A recommend reports for me 512 option is included on the OAR page 504. The recommend reports for me 512 option causes the data quality server 112 to present one or more predefined reports, or optional criteria for reporting, to the user 406. The data quality server 112 may use the data checking module 116 or another resource to perform a comprehensive content analysis of the mirrored data 114 previously received from, or of interest to, the user 406 (i.e., the entity 102(1) associated therewith). The data quality server 112 may use the results of the analysis to identify reporting criteria or predefined reports including such criteria to be presented to the user 406.

The OAR page 504 includes a my budget for services 514 selection input box for defining a dollar value input by the user 406, and a remaining dollar value display box. The monetary value entered by a user in the my budget for services 514 selection box may set a cap or upper limit on the number or intensity of data quality checking services performed, or the detail or particular features included within a corresponding report. As depicted, the user 406 has input an amount of one-thousand dollars to define a budget cap for overall data quality checking and reporting services, of which six-hundred forty dollars remain for the present budget period. Other budgetary definition or management schemes may also be used.

For example, the user 406 may define a first budget amount to be applied to the data quality checking (e.g., application of data quality rules), and a second budget amount to be applied to data quality reporting (e.g., detail or content of the report(s)). In another example, the user 406 may define a single budget amount and percentages allocated for respective services, such as two-thousand dollars total with 60% allocated for data quality checking and 40% allocated for data quality reporting.

A budget applies per 514(1) option includes Weekly, Monthly and Agreement checkboxes. The user 406 is required to select one of the boxes; no default applies to the option 514(1) and the respective checkboxes are mutually exclusive. The selection made for the option 514(1) determines how the budget amounts specified in the selection box 514 is applied. As indicated, for example, the one-thousand dollar budget previously specified by the user 406 will be applied each month. Thus, data quality services provided each month for the user 406 (or entity 102(1) corresponding thereto) will be limited to $1000 in scope or intensity.

A use prioritized data quality rules 514(2) option includes a single checkbox. Selection of the option 514(2) causes the data checking module 516 to apply the data quality rules 118 in a ranked or hierarchical manner during mirrored data 114 quality checking on behalf of the user 406, so as to remain with the corresponding budget amount (e.g., $1000 per month). The data quality rules germane to the user 406 may be previously ranked in order of significance, or the data checking module 516 may apply a general rule ranking policy.

In this way, the user 406 may remain within a periodic operating budget, while still getting the benefit of data quality checking, even if the degree or rigor of such checking may vary from one reporting period to the next. Each report received by the user 406 or corresponding entity 102(1)-102(3) may indicate which rules or criteria were checked against the mirrored data, thus informing the user 406 of the scope of that report. The user 406 may be incentivized to increase their budget amount 514 if reports suggest that present levels of data quality checking are inadequate.

The OAR page 504 also includes a define my entity or business type 516 selection. The selection 516 includes 6 respective predefined choices, including: a retailer 516(1) option; an industrial/processing 516(2) option; a manufacturing 516(3) option; a corporate business unit 516(4) option; a technical services 516(5) option; and a (default) other 516(6) option. The 6 respective options 516(1)-516(6) allow the user 406 to select the one that is the most descriptive of their function or interest.

For example, the reporting module 120 may be configured to use the selection 516(1)-516(6) to identify particular data quality rules 118 or reporting criteria that are of significance to the user 406 and present that information as a recommendation. In another example, the reporting module 120 may be configured to prioritize or rank the data quality rules 118 or reporting criteria based on the selection 516(1)-516(6). Other uses or operations based on the selection 516 may also be performed.

The OAR page 504 also includes a learn how to set data correction schema 518 option. The option 518 causes the data quality server 112 to provide tutorial information regarding how data may be automatically corrected, by way of the data correction module 124 and the data correction schema 126. For example, the user 406 may be shown that certain data are relevant only as integer values, and may be automatically truncated to zero decimal points (i.e., the fractional value removed) to define corrected data values. In another example, the user 406 may be instructed that all non-alphanumeric characters (i.e., various punctuation or other marks) in a string may be replaced with dashes (e.g., "-") in the interest of formatting or convention. In this way, the user 406 may develop their own automatic data correction processes, or understand what predefined data correction options are available.

A view my service level agreement 520 option is also provided by the OAR page 504. The option 520 causes the data quality server 112 to present a corresponding service level agreement or agreements to the user 406. Services, options, terms and other details of an agreement or agreements between the user 406 and the ownership or administrative entity of the data quality server 112 may be reviewed. The OAR page 504 may further include numerous other options or links to information or tutorials. For example, an option may allow a user 406 to view data quality rules that are presently (i.e., actively) being used or are frequently applied. In another example, an option may present information or a "dashboard display" of actions presently being performed by a data quality service (e.g., the data quality server 112). Other options or informational links may also be used.

Figure 6:
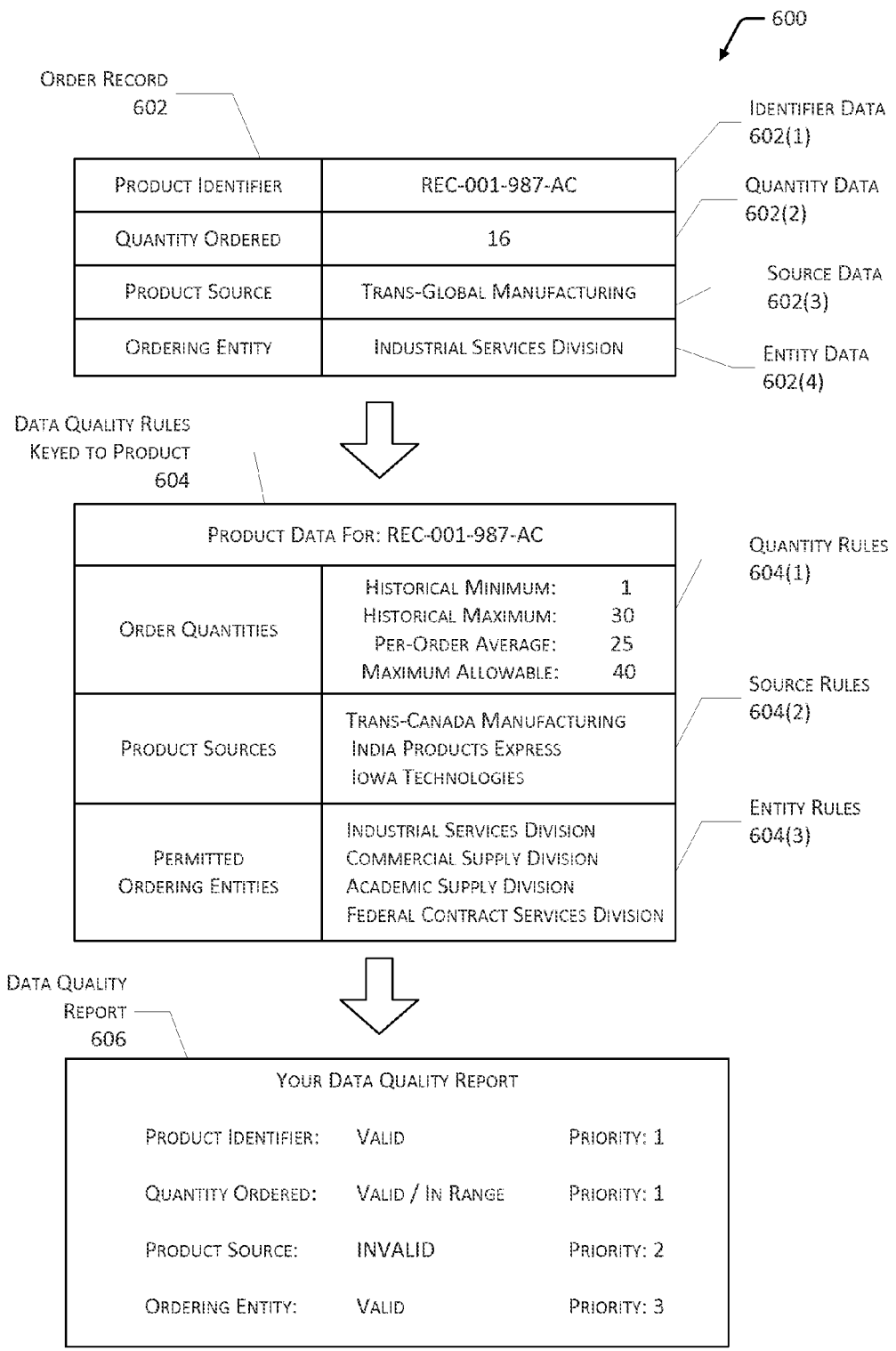
FIG. 6 depicts illustrative data, data quality rules applicable to the data, and corresponding data quality report.

FIG. 6 depicts views 600 of illustrative data, data quality rules, and a data quality report. The data and operations of the views 600 are non-limiting in nature, and other types of data, data quality rules or operations or results may be used.

An order record 602 includes 4 respective data types or elements corresponding to a customer order for merchandise. For example, the order record 602 may include entity data 104(1) provided by the entity 102(1) to the data warehouse server 108. The data warehouse server 108 may mirror the order record 602 contents as mirrored data 114 provided to the data quality server 112. Other operations or data exchanges using the order record 602 are also possible.

The order record 602 includes identifier data 602(1). The identifier data 602(1) includes or is defined by a merchandise number, SKU number, or other information to specifically identify the particular item ordered by a customer. The order record 602 also includes quantity data 602(2). The quantity data 602(2) is an integer value of the number of units or package counts of the merchandise item of the identifier 602(1). As depicted, the customer has ordered 16 count of the merchandise item identified as REC-001-987-AC. For purposes of example, the merchandise item REC-001-987-AC is a replacement dust filter for an air conditioning unit.

The order record 602 also includes source data 602(3). The source data 602(3) identifies or names the particular manufacturer, brand or supplier of the merchandise ordered by the customer. As depicted in the example, the customer has cited or input the name TRANS-GLOBAL MANUFACTURING as the source data 602(3). The order record 602 further includes entity data 602(4). The entity data 602(4) identifies the name of the entity through which the customer placed their order. For example, the entity 102(1) may be a business unit identified as the INDUSTRIAL SERVICES DIVISION within a corporation, and is the entity through which the costumer placed their order.

Data quality rules keyed to product (rules) 604 include 3 different subsets of information keyed to respective data elements of the particular merchandise item of the order record 602. Thus, the rules 604 pertain to the merchandise item identified as REC-001-987-AC. In one example, the rules 604 define at least a portion of the data quality rules 118 of the data quality server 112. The rules 604 may be stored or used within another server or entity, as well.

The rules 604 include quantity rules 604(1). The quantity rules 604(1) include 4 different statistical or predefined values against which the quantity data 602(2) value may be checked. As depicted, historical minimum and maximum orders of 1 and 30, respectively, have been placed for the merchandise item. Additionally, the average per-order quantity for the merchandise item is 25. Furthermore, a rule sets the maximum allowable per-order quantity at 40. Thus, the first 3 values of the quantity rules 604(1) are statistically derived from historical customer order data and are potentially (or likely) subject to change over time, while the last value may be established or modified in accordance with company policy, administrative decisions, or other factors.

The rules 604 include source rules 604(2), which include 3 different specific names or brands against which the source data 602(3) entry may be checked. In particular, the 3 named sources include: TRANS-CANADA MANUFACTURING; INDIA PRODUCTS EXPRESS; and IOWA TECHNOLOGIES. The list of names within the source rules 604(2) may be modified over time as sources are added or removed, and so on. For purposes of example, the 3 named sources define (at present) the only sources for the merchandise item REC-001-987-AC.

The rules 604 include entity rules 604(3), which include 4 different specific entity names against which the entity data 602(4) entry may be checked. As depicted, the 4 named entities—each of which being a business unit within the same corporation—include: INDUSTRIAL SERVICES DIVISION; COMMERCIAL SUPPLY DIVISION; ACADEMIC SUPPLY DIVISION; and FEDERAL CONTRACT SERVICES DIVISION. The list of names within the entity rules 604(3) may be modified over time as sources are added or removed, and so on. For purposes of example, the 4 named entities are (at present) the only entities authorized to place orders for the merchandise item REC-001-987-AC.

The data checking module 116 of the data quality server 112 may check the data elements 602(1)-602(4) against the rules 604. In a present example, the identifier data 602(1) checks "Valid" because the particular merchandise item REC-001-987-AC is cited, verbatim, within the data quality rules 118 and includes its own subset of rules 604. Next, the quantity data 602(2) checks "Valid" because the particular value 16 is lesser than the maximum allowable per-order quantity of 40. Furthermore, the value 16 is consistent with the present historical minimum and maximum, but is less than the per-order daily average.

However, the source data 602(3) checks "Invalid" because the cited product source name TRANS-GLOBAL MANUFACTURING is not, verbatim, an element of the source rules 604(2). The ordering customer may have intended to cite or enter TRANS-CANADA MANUFACTURING based on partial text heuristics or similar reasoning. Nonetheless, the source data 602(3) is "Invalid" for purposes of the present illustration.

Finally, the entity data 602(4) checks "Valid" because the cited entity name INDUSTRIAL SERVICES DIVISION is authorized to order the merchandise item REC-001-987-AC in accordance with the entity rules 604(3). That is, the entity data 602(4) entry is a verbatim element of the entity names listing of the entity rules 604(3). The data checking module 116 then provides the results of the data checking operation just performed, as well as the data values 602(1)-602(4), to the reporting module 120.

The reporting module 120 may generate one or more reports using the checking results just received from the data checking module 116. For purpose of example, the reporting module 120 may generate a data quality report 606 in accordance with the particular user options and inputs illustrated within the report template 404. Other reports having respectively varying information or indications may also be generated and provided.

Accordingly, the data quality report 606 indicates that product identifier, as provided in order record 602 is "Valid". That is, the merchandise item REC-001-987-AC is specifically known and may be ordered by the customer. The data quality report 606 further indicates, for purposes of example, that the product identifier is a "Priority 1" matter of concern. That is, the validity of the identifier data 602(1) is of greatest concern, in accordance with applying the data quality rules 604 in a prioritized manner (e.g., 514(2) for a particular user (e.g., 406)).

For example, the user 406 may rank the respective data elements 602(1)-602(4) by varying degrees of importance because errors or inconsistencies in those respective data elements give rise to problems or issues of differing severity. In contrast, a different user may rank the data elements 602(1)-602(4) differently because of other concerns or responsibilities. Thus, the data quality rules 604 may be applied in accordance with user-specific priorities, and the corresponding report or reports reflect or indicate those priorities accordingly. Furthermore, the user 406 may be billed in accordance with the priorities that they define. For example, if the user 406 prioritizes all of the respective data elements 602(1)-602(4) as "Priority 1", then data quality checking and data quality reporting may be more rigorous and the corresponding prices of services may be higher, than under a hierarchy of lower priorities.

The data quality report 606 also indicates that the quantity ordered in the order record 602 is "Valid". Specifically, the ordered quantity of 16 does not violate any of the applicable rules, nor trigger further inquiry. Additionally, the quantity 16 falls within the range of 1 to 20 specified as valid per the selection 410(4). The data quality report 606 further indicates that the quantity ordered is also a "Priority 1" concern.

The data quality report 606 indicates that the product source specified in the order record 602 is "Invalid". The invalid indication corresponds to the fact that the cited source name, TRANS-GLOBAL MANUFACTURING, is not a listed source for the merchandise item. The data quality report 606 indicates that the product source is a "Priority 2" level of concern. In the present example, the validity of the source data 602(3) is of relatively significant concern, but lesser so than data having a "Priority 1" level.

The data quality report 606 further indicates that the ordering entity provided in the order record 602 is "Valid". Again, the ordering entity, INDUSTRIAL SERVICES DIVISION, is authorized to order or broker orders for the merchandise item REC-001-987-AC. The data quality report 606 indicates that the ordering entity is a "Priority 3" concern, deemed to be of lesser significance than respective "Priority 1" or "Priority 2" data.

The data quality report 606 may be provided to an entity or entities in accordance with a service level agreement, internal auditing practice, and so on. For example, the data quality report 606 may be provided to the user 406 by way of a user device associated with, or defining, the entity 102(1).

Figure 7:
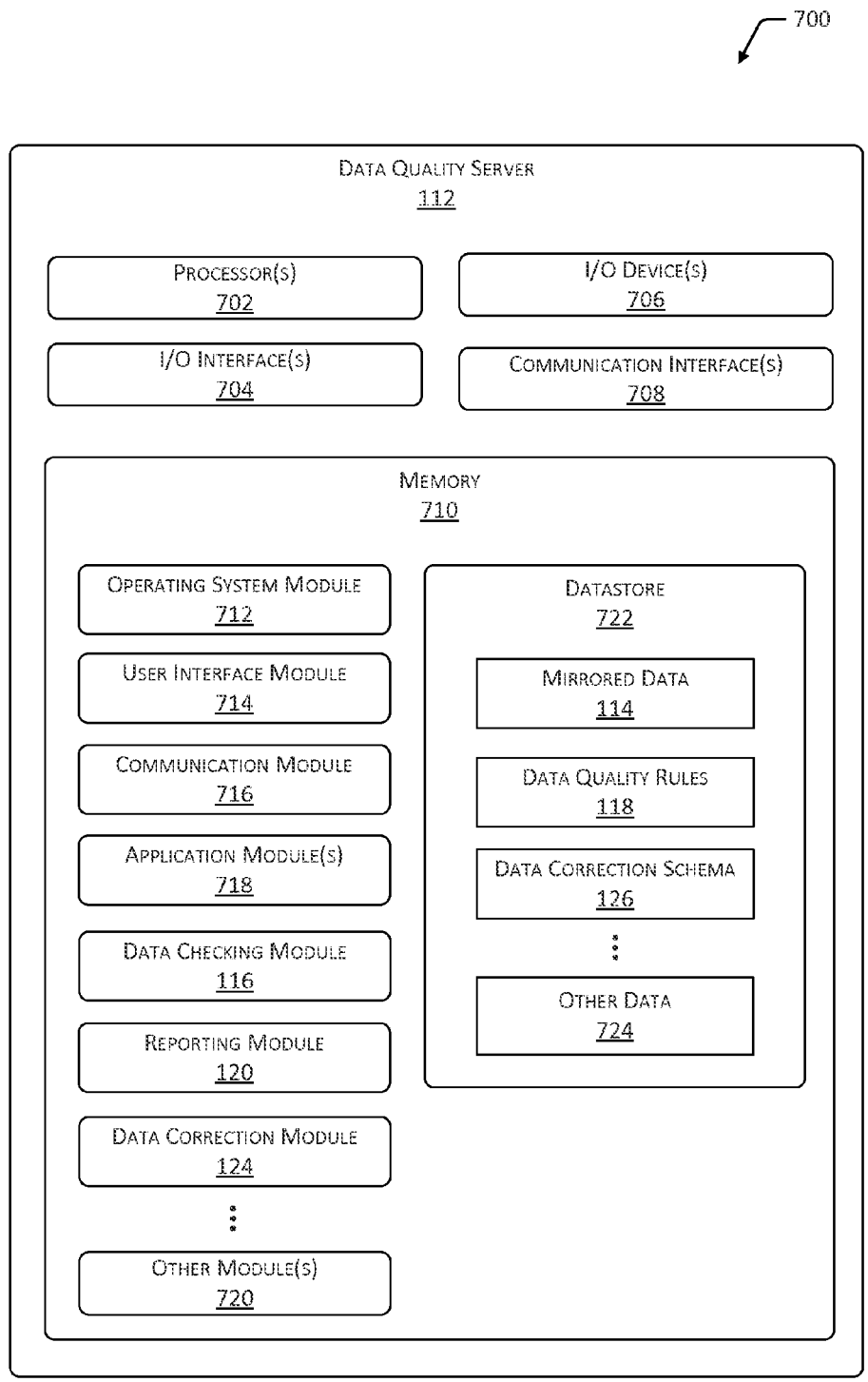
FIG. 7 is a block diagram of a data quality server and illustrative constituency.

FIG. 7 illustrates a block diagram 700 of the data quality server 112 that may be configured to receive mirrored data 114, store the mirrored data 114, quality check the mirrored data 114, generate corrected data from the mirrored data 114, or any combination of these or other operations. The data quality server 112 may include one or more processors 702 configured to execute one or more stored instructions. The processor(s) 702 may comprise one or more cores.

The data quality server 112 may include one or more I/O interface(s) 704 to allow the processor(s) 702 or other portions of the data quality server 112 to communicate with user devices or other resources of the respective entities 102(1)-102(3), with the data warehouse server 108, with the cost allocation server 130, and so on. The I/O interfaces 704 may comprise Inter-Integrated Circuit (I2C), Serial Peripheral Interface (SPI), Universal Serial Bus (USB), RS-232, and so forth.

The I/O interface(s) 704 may couple to one or more I/O devices 706. The I/O devices 706 may include input devices such as one or more of a keyboard, mouse, and so forth. The I/O devices 706 may also include output devices such as one or more of a display, audio speakers, haptic output devices, and so forth. In some embodiments, the I/O devices 706 may be physically incorporated with the data quality server 112 or may be externally placed.

The data quality server 112 may also include one or more communication interfaces 708. The communication interfaces 708 are configured to provide communications between the data quality server 112, user devices or resources of the entities 102(1)-102(3), routers, access points, other servers, and so forth. The communication interfaces 708 may include devices configured to couple to one or more networks including PANs, LANs, WLANs, WANs, and so forth.

The data quality server 112 may also include one or more busses or other internal communications hardware or software that allow for the transfer of data between the various modules and components of the data quality server 112.

The data quality server 112 includes one or more memories 710. The memory 710 comprises one or more CRSM. The memory 710 provides storage of computer readable instructions, data structures, program modules and other data for the operation of the data quality server 112.

The memory 710 may include at least one operating system (OS) module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A user interface module 714 may be configured to provide one or more application programming interfaces. The user interface module 714 may also provide data configured to provide the user interfaces 402 or 502, or other user interfaces to the entities 102(1)-102(3), or to other entities or user devices. Such user interfaces may be encoded as hypertext markup language ("HTML") files, extensible markup language ("XML") files, or in another suitable format or language. The user interface module 714 is configured to accept inputs and send outputs using the I/O interfaces 704, the communication interfaces 708, or both.

A communication module 716 is configured to support communication with the entities 102(1)-103(1), the data warehouse server 108, the cost allocation server 130, routers, and so forth using one or more networks 106. In some implementations, the communication module 716 may support encrypted communications. For example, hypertext transport protocol secured ("HTTPS") or transport layer security ("TLS") may be supported.

The memory 710 may also include one or more application modules 718. The application modules 718 may be configured or modified, and selectively used or provided to other entities as needed or requested. Thus, the data quality server 112 can be updated or enhanced as new application modules 718 are generated, existing application modules 718 are amended or improved, and so on.

The memory 710 may also include the data checking module 116. The data checking module 116 may include any resources, not limited to machine-readable program code stored on a CRSM, or other constituency. As described above, the data checking module 116 is configured to check the mirrored data 114 against the one or more data quality rules 118, or subsets of such rules (e.g., 604) stored within the data quality server 112.

The memory 710 may also include the reporting module 120, which is configured to use results, data, or other information from data checking module 116 to generate one or more reports. Such one or more reports are provided by way of the data quality reporting 122 to respective ones of the entities 102(1)-102(3), or to another entity or entities. The reporting module 120 may include any resources, not limited to machine-readable program code stored on a CRSM, or other constituency.

The memory 710 may also include the data correction module 124, as is configured to automatically correct some or all of the mirrored data 114 using the data correction schema 126. Resulting corrected data 128 may be provided back to the data warehouse server 108, where it may substituted in place of corresponding (erroneous) data within the consolidated data 110, or stored or used in other ways. The data correction module 124 may include any suitable resources such as, without limitation, machine-readable program code stored on a CRSM, or other constituency.

Other modules 720 may also be present. In one implementation, a billing or cost allocation module may be configured to calculate billing values in accordance with various operations performed by the data quality server 112. Such values can be calculated per user (e.g., 406) or service subscriber budget amounts (e.g., 514), in accordance with in-house price structures or polices, as defined in respective service agreements, and so on. In another implementation, a translation module may be configured to provide translation of viewable content, messages, or both, enabling directed interaction of a group of users 406 which use different languages. Other modules or functionalities may also be implemented.

The memory 710 may also include a datastore 722 to store information. The datastore 722 may use a flat file, database, linked list, tree, executable code, or other data structure to store the information. In some implementations, the datastore 722 or a portion of the datastore 722 may be distributed across one or more other devices including servers, network attached storage devices and so forth.

The datastore 722 may store the mirrored data 114, the data quality rules 118, the data correction schema 126, or any combination of these, as respectively previously described. Other data 724 may also be stored. For example, the other data 724 may include one or more service agreements between the owner or administrator of the data quality server 112 and the respective responsible parties of the entities 102(1), 102(2) or 102(3), or with other entities or service subscribers.

Figure 8:
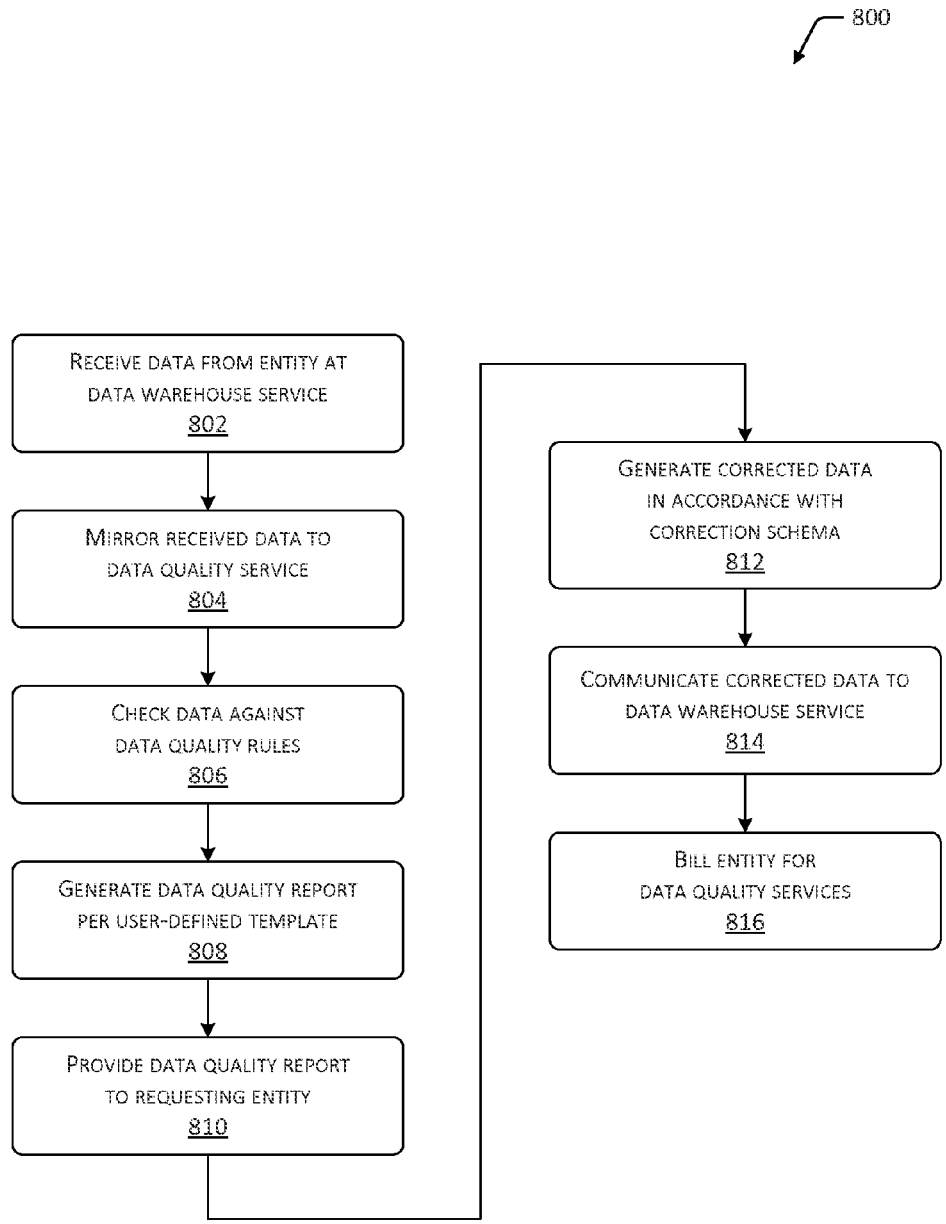
FIG. 8 is a flow diagram of an illustrative process including data checking, data quality reporting and automatic data correction.

FIG. 8 is a flow diagram 800 of a process including checking data quality, reporting the results of such checking, and automatically correcting data. In some implementations, this process may be implemented by way of the system of the view 100 and the respective entities and resources thereof. The process of the flow diagram 800 is illustrated below by way of at least some elements and operations described above. The illustration is non-limiting in nature and other respectively varying or analogous processes may also be performed.

Block 802 receives entity data 104(1) from the entity 102(1) at a data warehouse service. For example, the entity data 104(1) may be data and information corresponding to a customer order for an item or items of merchandise, such as the respective data 602(1)-602(4) of the order record 602. The entity data 104(1) is thus provided to the data warehouse server 108.

Block 804 mirrors the received entity data 104(1) to a data quality service, such as executing on one or more data quality servers 112. In the present example, the received entity data 104(1) is thus mirrored, or copied, as mirrored data 114 that is received and stored in the data quality server 112. Therefore, 2 identical copies of the order record 602 now exist—1 copy that is stored within the data warehouse server 108, and 1 copy that is stored as at least a portion of the mirrored data 114 within the data quality server 112.

Block 806 checks the mirrored data 114 against the data quality rules 118. In the present example, the data checking module 116 checks or compares the just received mirrored data 114 against one or more of the data quality rules 118 that are applicable thereto. For instance, the checking may indicate that respective data 602(1), 602(2) and 602(4) are "Valid", and that the data 602(3) is "Invalid", per the rules 604 that are part of the data quality rules 118.

Block 808 generates the data quality report 606 per a user-defined template 404. In the present example, the reporting module 120 receives the respective "Valid" and "Invalid" indications derived at block 806 from the data checking module 116, as well as the actual data 602(1)-602(4). The reporting module 120 then uses the "Valid"/"Invalid" indications, the data 602(1)-602(4), and the selections and inputs made to the report template 404 so as to generate the data quality report 606. In particular, the reporting module 120 causes the data quality report 606 to indicate that the order quantity (i.e., quantity data 602(2)) value is "In Range" in accordance with the 410(4) selection, as well as being "Valid".

Block 810 provides the data quality report 606 to the requesting entity 102(1). In the present example, the data quality report 606 is provided by way of data quality reporting 122 to the entity 102(1), for review or use by the user 406 associated therewith.

Block 812 generates corrected data 128 in accordance with the data correction schema 126. In the present example, the data correction module 124 generates one or more elements of corrected data 128 using applicable operations or functions of the data correction schema 126. For instance, the source data 602(3) was erroneously provided as TRANS-GLOBAL MANUFACTURING by way of the order record 602. The data correction schema 126 may be configured to determine that TRANS-CANADA MANUFACTURING is the correct source name by way of a heuristic or "best match" replacement function. The data correction module 124 then automatically replaces the source data 602(3) with the name (or string) TRANS-CANADA MANUFACTURING.

Block 814 provides the corrected data 128 to the data warehouse service. In the present example, the corrected source data 602(3), having the replacement string TRANS-CANADA MANUFACTURING, is provided as corrected data 128 from the data quality server 112 to the data warehouse server 108. Thus, the source data 602(3) of the order record 602 is automatically corrected and communicated back to the data warehouse server 108 for storage in place of, or in addition to, the original data of the order record 602.

Block 816 bills the entity 102(1) for data quality services. In the present example, the data quality server 112 provides information regarding the data quality checking and correction services just performed to the cost allocation server 130. In turn, the cost allocation module 132 calculates a billing value in accordance with the information, as well as a cost structure defined by a service level agreement, corporate policy, and so forth. The billing value may be stored for later use in a periodic billing cycle, provided or transmitted to the entity 102(1) or other entities now, or used for other purposes.

Figure 9:
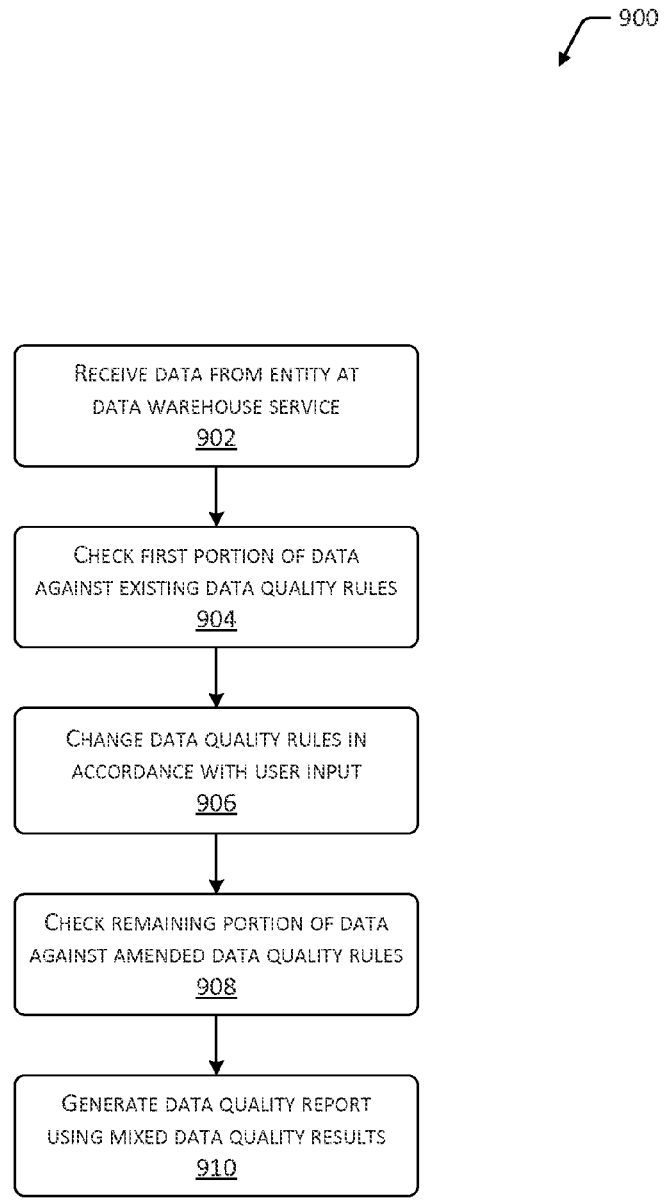
FIG. 9 is a flow diagram of an illustrative process including quality checking a first data portion, modifying applicable data quality rules, and checking a remaining data portion.

FIG. 9 is a flow diagram 900 of a process including checking data quality, reporting the results of such checking, and automatically correcting data. In some implementations, this process may be implemented by way of the system of the view 100 and the respective entities and resources thereof. The process of the flow diagram 900 is illustrated below by way of at least some elements and operations described above. The illustration is non-limiting in nature and other respectively varying or analogous processes may also be performed.

Block 902 receives entity data 104(3) from the entity 102(3) at a data warehouse service. For example, the entity data 104(3) may be a corpus or packet of information corresponding to an order for several items of merchandise in an online e-commerce environment. The packet of information may be designated as data #2 and received by the data warehouse server 108 as the operation 312. The data #2 is also being mirrored as the operation 314 to the data quality server 112 contemporaneous with, or nearly so, its reception from the entity 102(3).

Block 904 checks a first portion of the data #2 against the data quality rules 118. In the present example, the data checking module 116 checks one or more of the data quality rules 118 against a first portion of the data #2 as part of the operation 316. The data #2 checking of the operation 316 may determine if respective data elements are valid or invalid, comply with formatting, syntactical or numerical protocols, are elements found within predefined lists or sets, and so on.

Block 906 changes one or more of the data quality rules 118 in accordance with user input. In the present example, a system administrator (for instance, the user 406) accesses the data quality server 112 and modifies one or more of the data quality rules 118, at least some of the modified rules being applicable to the data #2. The data quality rule modification is performed as the operation 318. An initial portion of the operation 316 continues contemporaneous with the operation 318, using the pre-modified data quality rules 118.

Block 908 checks a second portion of the data #2 against the modified data quality rules 118. In the present example, the data checking module 116 checks one or more of the modified data quality rules 118 against a second or remaining portion of the data #2 as part of the operation 316. Thus, the modified data quality rules 118 are put to use immediately within the operation 316, as soon as the operation 318 is complete.

The use of the modified data quality rules 118 will or should, in at least some instances, yield different data checking results than that of the pre-modified data quality rules 118. That is, the first portion of data #2 resulted in a first set of data checking results, and the second portion of the data #2 resulted in a second set of data checking results that may differ from the first. These potentially mixed results are accumulated throughout the operation 316.

Block 910 generates a data quality report using the mixed data quality results. The reporting module 120 receives the (potentially) mixed data quality results from the data checking module 116 and generates a data quality report (e.g., 606) accordingly. The data quality report may be provided to the entity 102(3) by way of the data quality reporting 122. A reader or user (e.g., 406) of the data quality report just generated may compare the results of first portion relative to the second portion of the data #2 and evaluate the significance benefits (or the contrary) of the modified data quality rules 118 over the original data quality rules.

In one example, the modified data quality rules 118 may cause the report to indicate validity/invalidity based on a new formatting rule applied to product identifier data 204(2)—a quality check not previously performed. If data checking performed using the modified rule indicates that some appreciable portion of the mirrored data 114—including data received over the last few months—is non-compliant with established formatting policy, immediate investigative or corrective actions may be warranted.

In another example, the modified data quality rules 118 may cause the report to indicate validity/invalidity based on a new minimum annual order quantity that is greater than some previous such value. Checking the (historical) mirrored data 114 using the new minimum annual order quantity may indicates that a particular sales entity (e.g., 102(2)) has fallen behind in their sales metric for a corresponding item of merchandise. Countless other determinations may also be made, and the overall effectiveness and benefits of data checking may be improved, by way of new or modified data quality rules.

Those having ordinary skill in the art will readily recognize that certain components, steps, or operations illustrated in the figures above can be eliminated, taken in an alternate order, or otherwise rearranged. Moreover, the methods described above may be implemented as one or more software programs for a computer system and are encoded in a computer-readable storage medium as instructions executable on one or more processors.

The CRSM can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
one or more computing devices configured to:
    store data received from one or more entities;
    receive a first priority level associated with a first data quality rule and a second priority level associated with a second quality rule, wherein the first priority level is greater than the second priority level;
    determine a budget amount associated with the one or more entities;
    receive mirrored data from a data warehouse service, the mirrored data including at least some of the data from the one or more entities;
    perform a first analysis of the mirrored data using the first data quality rule based on the first priority level;
    calculate a billing value indicative of a cost of the first analysis of the mirrored data using the first data quality rule;
    determine a difference between the billing value and the budget amount;
    based on the difference between the billing value and the budget amount, perform one or more of:
        a second analysis of the mirrored data using the second data quality rule; or
        generation of an indication that the second analysis was not performed;
    generate a report based on the first analysis and the one or more of the second analysis or the indication;
    generate corrected data based on at least the first analysis and a correction scheme module;
    communicate the report to an entity; and
    communicate the corrected data to the data warehouse service.

2. The system of claim 1, the one or more computing devices further configured to:
    present one or more user interfaces by way of a display, the one or more user interfaces stored within the data quality service;
    receive user input by way of the one or more user interfaces, wherein the user input includes one or more of the first priority level, the second priority level, or the budget amount; and
    perform at least one of the analyzing the mirrored data, the generating the report, or the generating the corrected data using the user input.

3. The system of claim 1, wherein the data warehouse service and the data quality service are respectively configured such that the receiving the data from the one or more entities and the receiving the mirrored data and the analyzing the mirrored data are performed at least partially contemporaneously.

4. The system of claim 1, wherein performing the first analysis includes:
   analyzing a first portion of the mirrored data using the first data quality rule;
   receiving user input modifying the first data quality rule to form a modified first data quality rule;
   analyzing a second portion of the mirrored data using the modified first data quality rule; and
   providing the report with an indication of analysis of the first portion of the mirrored data using the first data quality rule and the second portion of the mirrored data using the modified first data quality rule.

5. The system of claim 1, wherein generating the corrected data includes one or more of:
   converting a non-whole number into an integer value;
   determining correspondence between an alphanumeric string and a predefined set of alphanumeric strings and replacing the alphanumeric string with a predefined alphanumeric string of the predefined set;
   replacing one or more characters within an alphanumeric string with characters determined from a predefined syntax; or
   replacing a value determined to be outside of a threshold range with a default value.

6. A system, comprising:
   one or more computing devices configured to implement a data quality service, wherein the data quality service is configured to:
      access a plurality of data quality rules, wherein at least a subset of the data quality rules includes one or more priority levels;
      access data originating from at least one entity;
      access a predefined budget amount associated with the at least one entity;
      determine a priority level of a first portion of the data quality rules to indicate a priority greater than that of a second portion of the data quality rules;
      compare the data against the first portion of the data quality rules based at least partially on the priority level;
      determine a cost associated with comparing the data against the first portion of the data quality rules;
      determine one or more of:
         the cost to equal or exceed the predefined budget amount; or
         a sum of the cost associated with comparing the data against the first portion of the data quality rules and a cost associated with comparing the data against a second portion of the data quality rules to equal or exceed the predefined budget amount;
      generate a report in accordance with the comparison, the report comprising:
         results corresponding to a report template, the report template based at least in part on user input, the report template including one or more predefined options selectable by a user, and
         the report including an indication of priority for individual elements of the data and an indication that analysis of the data using the second portion of the data quality rules was not performed; and
      provide the report to one or more entities remote to the data quality service.

7. The system of claim 6, wherein the data quality service is further configured to:
   generate corrected data using one or more correction schema applied to the data, at least one of the correction schema defined by way of the user input, wherein the generating of corrected data includes one or more of:
      converting a non-whole number into an integer value;
      determining correspondence between an alphanumeric string and a predefined set of alphanumeric strings and replacing the alphanumeric string with a predefined alphanumeric string of the predefined set;
      replacing one or more characters within an alphanumeric string with characters determined from a predefined syntax; or
      replacing a value determined to be outside of a threshold range with a default value; and
   communicate the corrected data to a data warehouse service.

8. The system of claim 6, wherein the data quality service is further configured to communicate information to a cost allocation service, the information indicative of one or more operations performed by the data quality service, the cost allocation service configured to calculate a billing value using the information.

9. The system of claim 6, wherein the data quality service is further configured to discontinue the generating the report in response to reaching a corresponding budget amount, the budget amount defined by a user under a service level agreement with the data quality service.

10. The system of claim 6, wherein the data quality service is further configured to cause at least one of the following to be presented by way of a user interface:
   information regarding the data quality rules;
   information regarding one or more report templates;
   information regarding a service level agreement;
   costs allocated for services performed by the data quality service;
   information regarding automatic data correction schema;
   information regarding the data quality rules in use; or
   information regarding actions presently being performed by the data quality service.

11. The system of claim 6, wherein the data quality service is further configured to:
   compare a first portion of the data against the data quality rules;
   receive user input modifying the data quality rules to form; amended data quality rules;
   compare a second portion of the data against the amended data quality rules;
   generate a report indicative of analysis of the first portion of the data using the data quality rules and the second portion of the data using the amended data quality rules; and
   provide the report to one or more entities.

12. The system of claim 11, wherein the data quality service is further configured such that the user input regarding the data quality rules is received during at least some of the comparing the first portion of the data against the data quality rules.

13. The system of claim 6, wherein the data quality service is further configured such that the predefined budget amount is established by the user input to a user interface, the user interface provided to another entity.

14. One or more non-transitory computer-readable storage media including a program code, the program code configured to cause one or more processors to:
   acquire data from a storage entity;
   analyze the data using data quality rules, the data quality rules stored so as to be accessible by the one or more processors, one or more of the data quality rules established using user input to a user interface including priority levels corresponding to at least a portion of the data quality rules and a user budget amount, the analyzing being performed by:
  applying a first portion of the data quality rules to the data in an order corresponding to descending priority;
  determining one or more of:
    a cost associated with application of the first portion of the data quality rules to the data to equal or exceed the user budget amount; or
    a sum of the cost associated with application of the first portion of the data quality rules and a cost associated with application of a second portion of the data quality rules to the data to equal or exceed the user budget amount;
generate at least one report in accordance with the analyzing, the generating based at least in part on the user budget amount, wherein the at least one report includes an indication that analysis of the data using the second portion of the data quality rules was not performed; and
communicate the report to one or more other entities.

15. The computer-readable storage media of claim 14, the program code further configured to cause the one or more processors to:
  derive corrected data from the data using a data correction scheme, the data correction scheme stored so as to be accessible by the one or more processors, wherein the corrected data is derived by one or more of:
    converting a non-whole number into an integer value;
    determining correspondence between an alphanumeric string and a predefined set of alphanumeric strings and replacing the alphanumeric string with a predefined alphanumeric string of the predefined set;
    replacing one or more characters within an alphanumeric string with characters determined from a predefined syntax; or
    replacing a value determined to be outside of a threshold range with a default value; and
  provide the corrected data to the storage entity.

16. The computer-readable storage media of claim 15, the program code further configured to cause the one or more processors to:
  cause options to be presented to a user regarding the data correction scheme;
  receive user selections in accordance with the options; and
  modify the data correction scheme in accordance with the user selections, the modified data correction scheme stored so as to be accessible by the one or more processors.

17. The computer-readable storage media of claim 14, the program code further configured to cause the one or more processors to:
  cause the user interface to be presented, the user interface including options regarding at least one of the data quality rules, the options comprising one or more predefined selections; and
  in response to receiving the user input by way of the user interface, modify at least one of the data quality rules in accordance with the user input, the modified data quality rules stored so as to be accessible by the one or more processors.

18. The computer-readable storage media of claim 14, the analyzing further being performed by:
  analyzing a first portion of the data using the data quality rules;
  receiving the user input modifying the data quality rules to form modified data quality rules;
  analyzing a second portion of the data using the modified data quality rules; and
  generating a report indicative of analysis of the first portion of the data using the data quality rules and the second portion of the data using the modified data quality.

19. The computer-readable storage media of claim 18, the program code further configured to cause the one or more processors to:
  analyze the first portion of the data using the data quality rules contemporaneous with receiving the user input modifying the data quality rules.

\* \* \* \* \*